US009603462B2

(12) United States Patent
Markowitz (10) Patent No.: US 9,603,462 B2
(45) Date of Patent: Mar. 28, 2017

(54) ANTI-SLIP PROTECTIVE COVER (71) Applicant: GREEN POINT DECOR, LLC, Brooklyn, NY (US)

(72) Inventor: Evan Markowitz, Brooklyn, NY (US)

(73) Assignee: GREEN POINT DECOR, LLC, Brooklyn, NY (US)

( * ) Notice: Subject to any disclaimer, the term of this patent is extended or adjusted under 35 U.S.C. 154(b) by 14 days.

(21) Appl. No.: 14/715,388

(22) Filed: May 18, 2015

(65) Prior Publication Data
US 2016/0338502 A1 Nov. 24, 2016

(51) Int. Cl.
*A47C 31/00* (2006.01)
*A47C 31/11* (2006.01)
*B60N 2/60* (2006.01)
*B60N 2/58* (2006.01)

(52) U.S. Cl.
CPC ............. *A47C 31/11* (2013.01); *B60N 2/60* (2013.01); *B60N 2/58* (2013.01); *B60N 2/609* (2013.01); *B60N 2/6018* (2013.01)

(58) Field of Classification Search
CPC .......... A47C 31/11; B60N 2/58; B60N 2/609; B60N 2/6018
USPC ........... 297/228, 228.13, 225, 228.1, 228.11, 297/228.12, 229, 219.1, 452.16
See application file for complete search history.

(56) References Cited

U.S. PATENT DOCUMENTS

| | | | | |
|---|---|---|---|---|
| 2,904,103 A | * | 9/1959 | Nail | B60N 2/60 297/224 |
| 3,102,759 A | * | 9/1963 | Stewart | B61F 15/02 384/276 |
| 4,563,785 A | * | 1/1986 | Samelson | A47G 9/10 112/475.08 |
| 4,793,012 A | * | 12/1988 | LaPorte | A45C 3/10 190/2 |
| 4,838,610 A | * | 6/1989 | Perrin | A47C 31/11 297/225 |
| 5,403,066 A | * | 4/1995 | Drum | B60N 2/6054 297/219.1 |
| 5,662,380 A | * | 9/1997 | Tam | B62B 7/123 280/642 |
| 5,809,595 A | * | 9/1998 | Stevens | B60N 2/6036 297/219.1 |
| 7,878,588 B2 | * | 2/2011 | Snedeker | A47C 31/11 297/218.1 |
| 8,733,837 B2 | * | 5/2014 | Weinstein | A47C 31/113 297/228 |

(Continued)

Primary Examiner — Chi Q Nguyen
(74) Attorney, Agent, or Firm — Dorsey & Whitney LLP (57) ABSTRACT

Disclosed herein is an anti-slip protective cover. The anti-slip protective cover includes a first layer formed of a protective material and a second layer formed of an anti-slip material, with the anti-slip material and the protective material having a peripheral region surrounding an interior portion. The anti-slip protective cover also includes a connective material binding the first layer to the second layer at at least one location on the interior portion and along at least a location proximal to the peripheral region. The connective material may be arranged in a plurality of strips extending across a portion of the interior portion of the anti-slip material and the protective material. The connective material may traverse the interior portion from a first portion of the peripheral region to a second portion of the peripheral region.

17 Claims, 5 Drawing Sheets (56) References Cited

U.S. PATENT DOCUMENTS

2007/0001503 A1\* 1/2007 Brady .................... A47C 16/02
  297/423.4
2014/0049091 A1\* 2/2014 Gross ....................... A47C 7/22
  297/452.63

\* cited by examiner

ANTI-SLIP PROTECTIVE COVER

TECHNICAL FIELD

Disclosed herein are furniture protectors and, more particularly, furniture protectors having an anti-slip surface.

BACKGROUND

Typical furniture articles including couches, chairs, or the like encounter high usage, causing wear and tear. These furniture articles benefit from the use of surface protection to extend their lives by reducing the wear and tear directly to the furniture themselves. In addition, most of these furniture articles are further benefited by the use of a movement reduction element that helps hold the surface protection in place so that the maximum benefit from the surface protection can be achieved.

Numerous different forms of movement reduction elements are used in the furniture protective cover industry. For example, high friction material is sometimes used as disclosed in U.S. Pat. No. 5,809,595 or U.S. Pat. No. 7,159,257. For example, flaps are sometimes incorporated into the surface protection. The flaps are appendages that extend from the surface protection to be tucked between cushions or the like. The pressure on the flaps between the cushions resists the movement of the surface protection when in use. These flaps may be located behind the seat cushion, or under the seat cushion. Examples of this are discussed in U.S. Pat. No. 7,431,394.

A suitable solution to overcome slippage problems in the furniture protective cover industry has not been provided. Specifically, a light-weight protective cover with an anti-slip material having suitable flexibility to drape in an aesthetic manner over a furniture article is desirable. It is desirable that the anti-slip solution does not significantly alter the flexibility of the protective cover while at the same time it maximizes the anti-slip effect on the furniture article.

SUMMARY

According to the present invention there is provided furniture protectors having an anti-slip surface as described in the accompanying claims.

Disclosed herein is an anti-slip protective cover suitable for use with various furniture articles, such as couches, loveseats, chairs, ottomans, or the like. The anti-slip protective cover can include a top layer formed of a protective material and a bottom layer formed of an anti-slip material, with the anti-slip material and the protective material having a peripheral region surrounding an interior portion. The anti-slip protective cover can also include a connective material binding the top layer to the bottom layer at at least one location on the interior portion and along at least a location proximal to the peripheral region. The connective material may be arranged in a plurality of strips extending across a portion of the interior portion of the anti-slip material and the protective material traversing the interior portion from a top portion of the peripheral region to a bottom portion of the peripheral region. The connective material may be intermittently positioned forming the strips extending across a portion of the interior portion. The anti-slip material and the protective material may be quilted together. The connective material may be an adhesive or a sewn attachment using thread. The anti-slip material may extend substantially co-extensive with the protective material.

Additional embodiments and features are set forth in part in the description that follows, and will become apparent to those skilled in the art upon examination of the specification or may be learned by the practice of the disclosed subject matter. A further understanding of the nature and advantages of the present disclosure may be realized by reference to the remaining portions of the specification and the drawings, which forms a part of this disclosure. One of skill in the art will understand that each of the various aspects and features of the disclosure may advantageously be used separately in some instances, or in combination with other aspects and features of the disclosure in other instances.

BRIEF DESCRIPTION OF THE DRAWINGS

The description will be more fully understood with reference to the following figures, which are presented as various embodiments of the disclosure and should not be construed as a complete recitation of the scope of the disclosure, characterized in that.

DETAILED DESCRIPTION

The subject matter of the disclosure herein may be described and implemented in various configurations and embodiments, and some particular embodiments may be described for purposes of explanation and illustration. It is to be understood, however, that other embodiments are within the scope of the invention.

Figure 1:
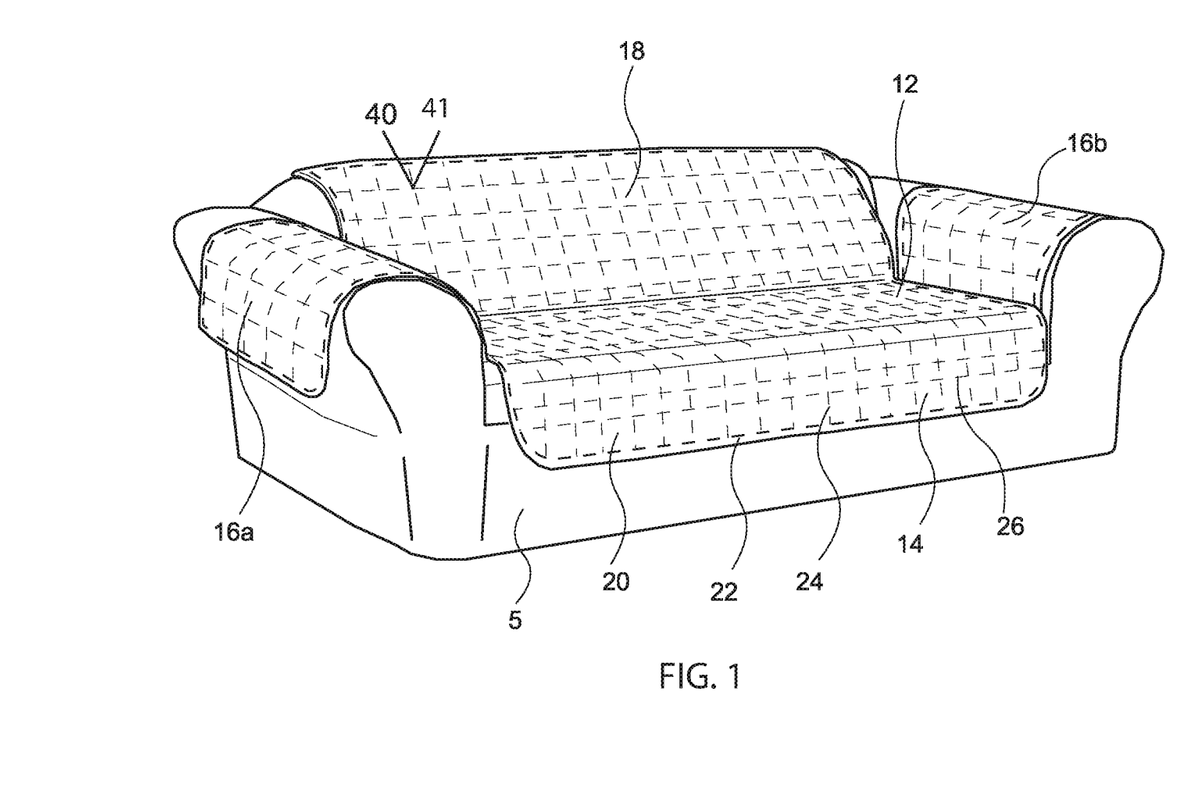
FIG. 1 is a perspective view of a furniture article with protective cover thereon in accordance with various embodiments.

FIG. 1 illustrates a perspective view of a furniture article 5 with and embodiment of a protective cover 10 thereon in accordance with various embodiments. As shown, the protective cover 10 may be drapable over a furniture article 5 such that the frequently used areas of the furniture article 5 are covered by the protective cover 10, thereby reducing wear and tear on the furniture article. For example, the protective cover 10 may extend over one or more of the seat, leg area (as used herein the leg area also reference generally to any draped portion that could extend down from the main panel in the absence of other features like legs, arms, or a back on the furniture), arms, or back of the furniture article 5. Areas of coverage may also or instead be selected for changing their appearance or texture.

Figure 2:
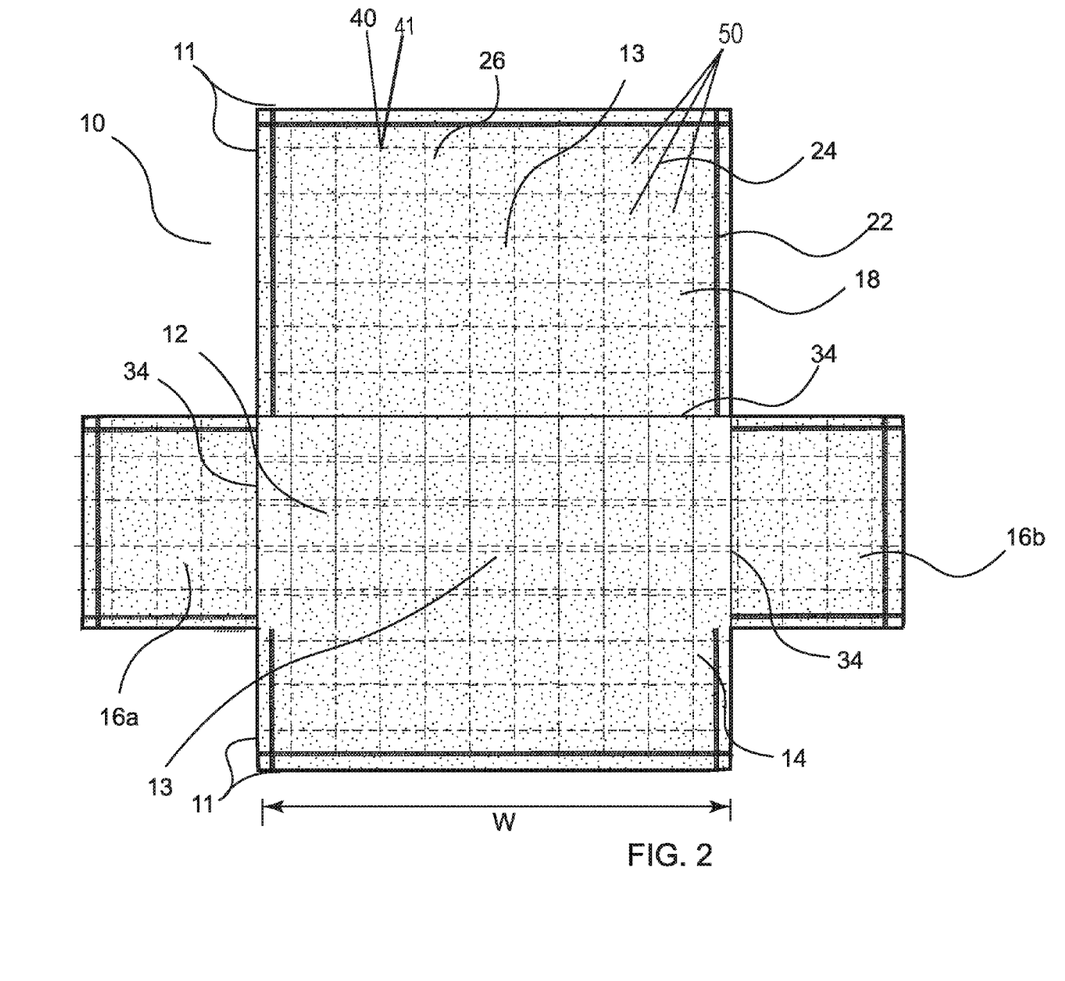
FIG. 2 is a top view of a protective cover in accordance with various embodiments.

As shown in FIGS. 1 and 2, the protective cover 10 may have one or more panels to cover the various portions of the furniture article 5. For example, the protective cover 10 may have a seat panel 12 positioned to cover the seat portion of the furniture article 5. The protective cover 10 may have a back panel 18 positioned to cover the back portion of the furniture article 5. The protective cover 10 may have a leg panel 14 positioned to cover the lower portion of the furniture article 5 on which legs may contact and apply wear and tear. The protective cover 10 may have one or more arm panels 16a, 16b positioned to cover the arm portion of the furniture article 5.

Each panel of the protective cover 10 can be made of a separate panel sewn to one or more of the other panels or each panel can be a part of a larger fabric panel forming the main portion of the protective cover (e.g. the seat panel 12). As illustrated in the examples below, a single fabric panel of continuous weave can include two furniture portion panels, such as the seat and leg panels; or alternatively, these can be made of panels of continuous weave, connected together such as by sewing or other suitable method. Additionally, each furniture panel can be made of a single manufactured panel or of multiple, independently manufactured panels that are attached to each other.

Figure 3:
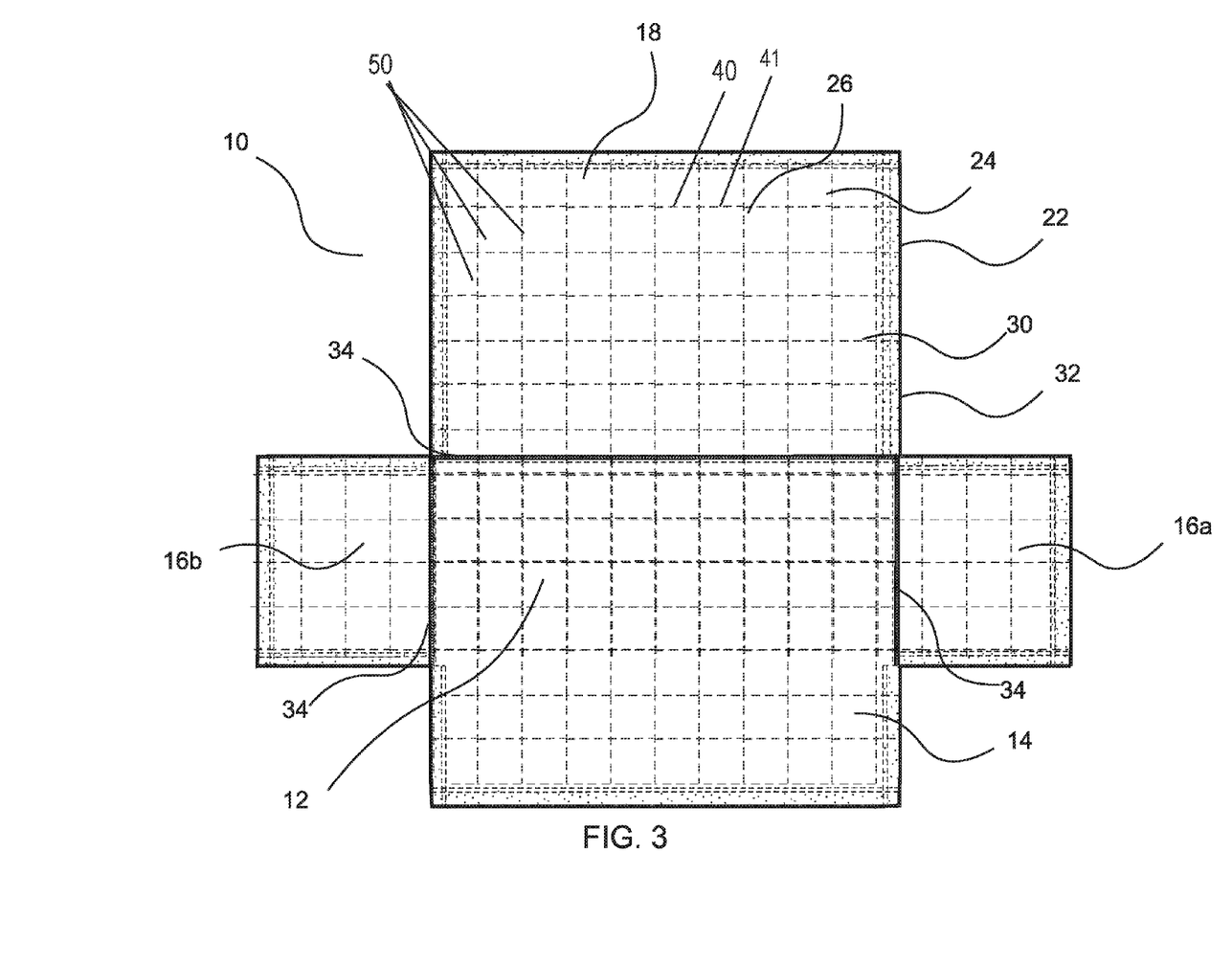
FIG. 3 is a bottom view of a protective cover in accordance with various embodiments; and, FIGS. 4A-E are bottom views of various protective covers illustrating connecting-material arrangements.

In accordance with various embodiments, and shown in FIGS. 2 and 3, the protective cover 5 may have a central panel. The central panel, depending on size or orientation, may be configured and operable as any of the above mentioned panels. In one example, the central panel may be the seat panel 12. One or more panels may extend from the central panel either laterally (e.g. arm to arm) or transversely (e.g. foot to back). For example, a back panel 18 may extend transversely from one edge of the seat panel 12. The back panel 18 and the seat panel 12 may be connected along a connecting seam 34. In one example, a leg panel 14 may extend along one side of the seat panel. The leg panel may also be connected to the seat panel 12 along connecting seam 34 or may be a contiguous portion of the seat panel 12. In another example, arm panels 16a, 16b may extend laterally from the seat panel 12. These arm panels 16a and 16b may likewise be connected along a seam 34 on each lateral end of the seat portion.

In various embodiments, one or more of the back panel 18, the leg panel 12, or the arm panels 16a, 16b may form a contiguous portion of the seat panel 12. In such embodiments, the cover may be sufficiently sized to extend over the back of furniture article 5, over the seat of furniture article 5 toward the floor, and/or laterally over the arms. Any one of the panels may extend any suitable length to provide a desired level of coverage of its corresponding furniture portion. For example, the seat panel or the main panel may extend about 80%, 90%, or 100% over the main area of the furniture (e.g. the seat of a chair or the table top of a table). Likewise the tertiary panels, e.g. the arm panels, the leg panels, or the back panels, if present, may extend between 10-100% over their respective areas of the furniture. For example, the leg panel 12 may extend to a desired length relative to the floor or down from the seat portion. For example, the leg panel may end approximately 8" from the floor. Alternatively, the leg panel 12 may extend all the way to the floor. In various embodiments, the protective cover may be limited to extending over one or two elements of the future article such as the seat portion and armrest, the seat portion and the backrest, the seat portion and the leg portion, or any other combination of furniture article elements. In various embodiments, the protective cover may extend over three or more of the elements in any combination. In various embodiments, the protective cover may extend over all wear and tear surfaces of the furniture article such as the backrest, the armrests, and the seat. The protective cover may include a draped portion extending down from the main panel (e.g. the seat portion).

In the furniture industry, furniture articles are made in a variety of sizes. For example, common configurations include chair, loveseat, and sofa size furniture articles. The protective cover as disclosed herein, however, may be applicable to varied types of furniture of different sizes, including tables, counters, benches, or the like. However, as way of example, it may be noted that for typical furniture, the protective cover may typically have a transverse width of about 75 inches and a lateral width L (as shown in FIG. 2) of about 65 inches to 120 inches, with chair sizes being closer to the 65 inch side of the range and couches being closer to the 120 inch side of the range, with loveseats being between. However, the furniture may be any width.

Each protective cover 10 may have a peripheral region 11 (also referred to as the periphery 11) and an interior portion 13, surrounded by the peripheral region 11. The peripheral edge 11 may be that portion of the protective cover 10 that is proximal to the peripheral region. The interior portion 13 may be the portion of the protective cover 10 that lies within the peripheral edge 11. In one example, the peripheral edge 11 may be considered the portion of the protective cover 10 having a finished edge 32 wherein the protective material 20 is folded back on itself along the peripheral region. The interior portion 13 may be areas of the protective cover 10 central to this feature.

In accordance with various embodiments, the protective cover 10 may be configured such that slippage on the furniture article 5 is minimized. As shown in FIG. 3, depicting a bottom view of a protective cover 10, the protective cover 10 may include a top layer 20 and a bottom layer 30 of material. The top layer 20 and the bottom layer 30 may be connected to one another at their respective peripheries 11 and/or their interiors 13. Such connections are discussed in more detail below.

In accordance with various embodiments, the top layer 20 or the cover layer may be the layer in direct contact with the user of the protective cover 10. This top layer 20 may be a protective material that may be operable to reduce the wear and tear discussed above. This protective material may have characteristics that provide equal to or greater protection or wear resistance as compared to the furniture material itself. However, in some embodiments, the protective material may have relatively weak protective or wear resistance characteristics but may still serve as a sacrificial layer for the furniture. Regardless of the heightened or lowered protective qualities of the top layer it may be referred to herein as a protective layer. This protective material is also shown for example in FIGS. 1 and 2. For example, the material may be made from a micro-suede product. Such a material may be knitted from 75D×T225D sea island filaments. Other materials may be used, however, such as natural materials (e.g. leathers, cottons, linins etc.) or synthetic materials (e.g. acetate, acrylic, nylon, polyester, rayon, etc.) These materials may be woven, knitted, non-woven, or a hybrid. For example, a natural material may be a polycotton blend or a synthetic material may be a polyrayon blend. Any hybrids or non-hybrids may be used.

Another layer 30 may be formed by an anti-slip material. The anti-slip material 30 may extend over a sufficient portion of the protective material 20 such that the movement of the protective cover 10 [over/across the surface of] the furniture article 5 is minimized. By increasing the coverage of the anti-slip material 30 relative to the protective material 20, the likelihood that pressure from a user of the protective cover 10 will force the anti-slip material 30 against the surface of the furniture article 5 and resist or stop sliding these between increases. In accordance with various embodiments, the anti-slip material 30 may extend over more than ¼ of the protective material. In some embodiments, the anti-slip material 30 may extend over more than half of the protective material 20. In some embodiments, the anti-slip material 30 may extend over between 50% and 95% of the protective material 20. In various embodiments, the anti-slip material 30 may be substantially co-extensive with the protective material 20.

The anti-slip material 30 may have a suitably high coefficient of friction to minimize sliding of the protective cover 10. For example, the anti-slip material 30 on the surface of furniture article 5 particularly has a coefficient of friction that is significantly greater than the protective material 20 on the surface of the same furniture article 5. This coefficient of friction may be greater than. To achieve this or a similar desired coefficient of friction range, a variety of materials can be used. The anti-slip material 30 may be made from any of a variety of polymers, fabrics (natural or synthetic), and composites of the two or other materials offering anti-slip properties. For example, a mesh material may be formed via a polymer or polymer fabric mesh and then sewn to the protective cover 10. In one example, the anti-slip material 30 may be made from a polymer-coated mesh fabric. In one example, the polymer may be a polyvinyl chloride (pvc) coating that coats a fabric such as a polyester mesh. In another example, the polymer may be an acrylonitrile-styrene resin that coats the same or similar type mesh fabric. However, it may be noted that any anti-slip material may be used to form the bottom layer 30. Other materials may include silicones, rubbers, polymers, other artificial materials or natural fibers. In one example, a mesh of adhesive may be formed by designing the mesh with an adhesive and then allowing it to dry. The dried adhesive may then form the anti-slip layer and be sewn to the protective layer forming the protective cover.

In accordance with various embodiments, as shown in FIGS. 1-3, the movement between the anti-slip material 30 and the protective material 20 may be minimized or negated by including attachment locations between the anti-slip material 30 and the protective material 20. The attachment locations 41 may be formed by any suitable device, method or material that connects the protective layer and the anti-slip layer. In various embodiments, the attachment locations may be formed by direct attachment of the two layers. This direct attachment may be made by welding one layer to the other. For example, the anti-slip layer may be made entirely of or partly of an elastomer that could be adhered to or melted to the anti-slip layer. In another embodiment, the attachment locations may be formed by a connecting material 40. For example, the connecting material 40 may be a stitching material used to sew or quilt one layer to the other. The stitching material may be any type of thread. In various examples, the thread may be similar in consistency, texture, color, or other characteristic as the protective layer or the second layer. Examples of these threads may include a thread formed of the same or similar material as the protective layer. In other examples, these threads may include a thread formed of the same or similar material as the anti-slip layer. In one example, polyester thread may be used in any of the various embodiments providing good strength while being inexpensive. In another example, the connecting material 40 may be an adhesive that binds the protective layer to the anti-slip layer. Adhesives may include traditional fabric glues, two sided tape, or strips of adhesive (as opposed to allover fabric coverage). In various embodiments, a laminate may be used. The laminate, however, may glue significant portions of the two fabrics together. Other adhesive method might include applying heat to the two fabrics so that they fuse. Another adhesive method may include using pinsonic quilting (which is high frequency sound waves plus rollers which put pressure between the two fabrics together). Another adhesive method may include hook and loop fasteners (e.g. Velcro).

Other connecting materials may include staples, adhesive, or similar types of mechanisms that can attach the layers of material together. The application may make reference to connecting material but it may be noted that this is merely by way of example, while each embodiment may also include the direct attachment or any form of attachment or embodiment of attachments disclosed herein.

In various embodiments, the attachment locations (e.g. connecting material as shown in FIGS. 22, 24, 25, 26, 27 as shown in FIGS. 4A-4E) may be dispersed with spacing between each of the attachment locations. The positioning of the attachment locations with the spacing may be arranged across one or more directions of the material. An example of an arrangement in two directions would be a quilting pattern of attachments locations connecting anti-slip layer and the protective layer. In this way an attachment may extend all the way or part way across the cover connecting the layers with a parallel attachment spaced apart from the first attachment with an unattached portion 50 extending between the two attached portions. In a different direction a similar arrangement may occur, with an angled attachment extending all the way or part way across the cover connecting the layers. This angled attachment being positioned at an angle to the first attachment. The angled attachment may also have a parallel attachment extending across or part way across the cover immediately adjacent two it. Each of the parallel attachments may have a space there between with the materials not being attached. The intervals of attached layers and unattached layers may provide a sufficiently discontinuous arrangement on the cover, such that it does not significantly modify the flexibility or rigidity of the protective cover 10. Each of the unattached portions 50 may be of sufficient size such that the flexibility of the cover 10 is not significantly modified. For example, in a quilted arrangement the unattached areas may be defined on each side by attached locations. In any of the various embodiments, parallel attached locations may define some portion of the unattached area between the layers. In various examples, the unattached portion 50 may be between $\frac{1}{5}$ the lateral length W or transverse length T of the cover and $\frac{1}{30}$ of the lateral length W or transverse length T of the cover. In various embodiments, the unattached locations may extend between 2-10 inches in the lateral length and between 2-10 inches in the transverse length.

Figure 4A:
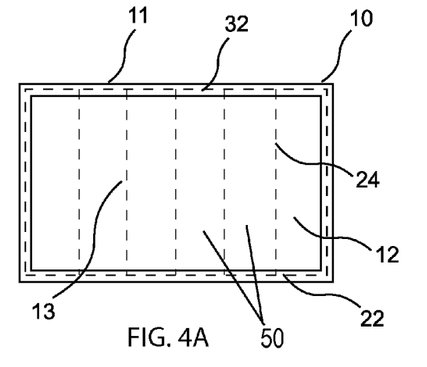
Figure 4B:
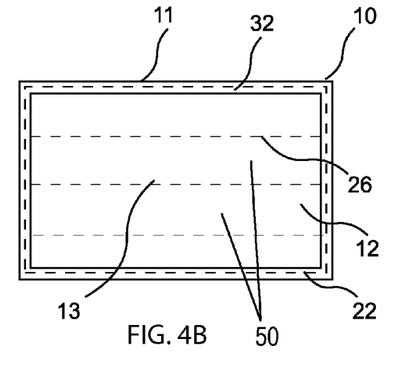

The connecting material may be discontinuous in one or more of two dimensional directions of the layers. The connecting material may, for example, be continuous in a lateral direction at various intervals but be discontinuous in the transverse direction as shown in FIG. 4B. Or, the connecting material may, for example, be continuous in a transverse direction at various intervals but be discontinuous in the lateral direction as shown in FIG. 4A. A combination of these two patterns may form a quilting pattern as shown in FIG. 4D. In this way the connecting material may form attached and unattached portions of the two layers at intervals across the cover in multiple directions. Each interval of unattached materials may be of other suitable sizes. The unattached portions may be increased in size by having the intervals between connecting materials increased. Conversely, the unattached portions may be decreased in size by having the intervals between the connecting materials decreased. By having the intervals of attached portions and unattached portions the flexibility is improved over the anti-slip layer continuously attached to the protective layer such as in laminating or gluing of the anti-slip layer to the protective layer.

For example, separate discrete dollops of adhesive (see connections 47 e.g. FIG. 4E) may be used to form separate discrete connection points between the protective layer 20 and the anti-slip layer 30. In another embodiment, separate discrete stitches may connect the protective layer 20 and the anti-slip layer 30. In another example, the connection between the protective layer 20 and the anti-slip layer 30 may be continuous for at least a short distance. The length of the continuous connection point may be minimized for an adhesive as it may affect the flexibility or the rigidity of the protective cover 10. In some embodiments the stitching material may extend across only a portion or across a few different portions of the cover 10. In other embodiments, the stitching material may extend all the way across or around the protective cover 10.

In accordance with various embodiments, as shown in FIGS. 1-4, the connecting material may form a connected periphery 22 between the protective layer 20 and the anti-slip layer 30. In accordance with various embodiments, the connecting material may also be located at the interior of the protective layer 20 and the anti-slip layer 30 forming an interior connection (e.g. 24, 25, 26, 27 of FIGS. 4A-E) between the two layers. By connecting the two layers at their respective interiors, movement between the two layers is minimized, negating need to increase the coefficient of friction between the two materials. Regardless of the locations of the connection material 40, it may be placed discretely or continuously. For example, the protective layer 20 and the anti-slip layer 30 may be connected by the connecting material 40 around the periphery with either discrete connection points or continuous expanse of connection material. Similarly, the protective layer 20 and the anti-slip layer 30 may be connected with either discrete connection points or a continuous expanse of connection material across the interior of the protective cover 10.

Figure 4C:
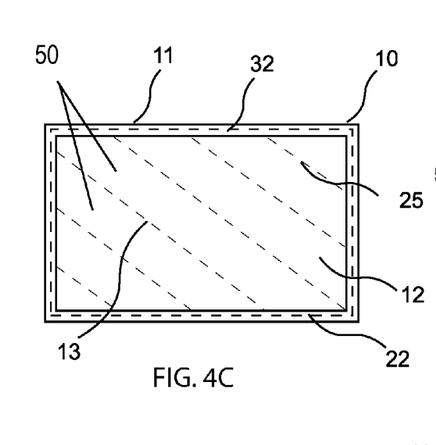
Figure 4D:
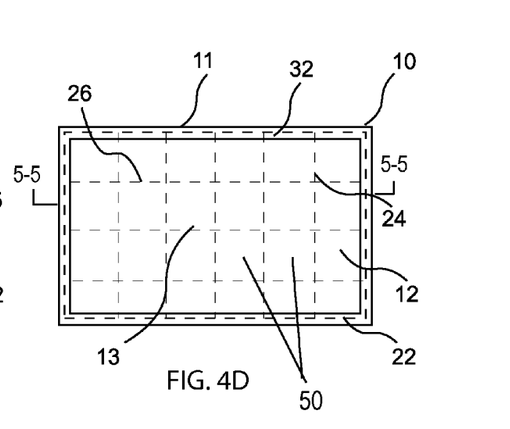
Figure 4E:
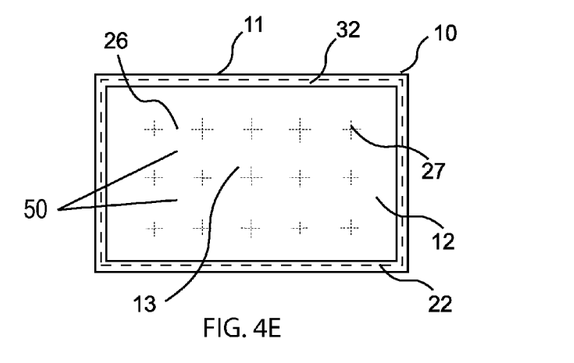

FIGS. 4A-E are various bottom views of protective covers illustrating various connecting material arrangements in accordance with various embodiments. In various examples, the protective layer and the anti-slip layer may be quilted together, with connection material extending in multiple directions across the cover 10. FIGS. 1, 2, 3 and 4D illustrate this configuration. FIG. 4A illustrates another example with connection material 24 extending transversely across the cover 10, with each portion of connection material extending in the same directions. In still another example, the connection material 26 may extend in a lateral direction as shown in FIG. 4B. In yet another example, the connection material 25 may include both a transverse component and a lateral component as shown in FIG. 4C. In another example, the protective layer and the anti-slip layer may be connected with discrete connections 27 as shown in FIG. 4E. As shown in each of these particular examples, the protective cover is formed from the protective layer and the anti-slip layer, which are connected at both their periphery and their interior.

Figure 5:
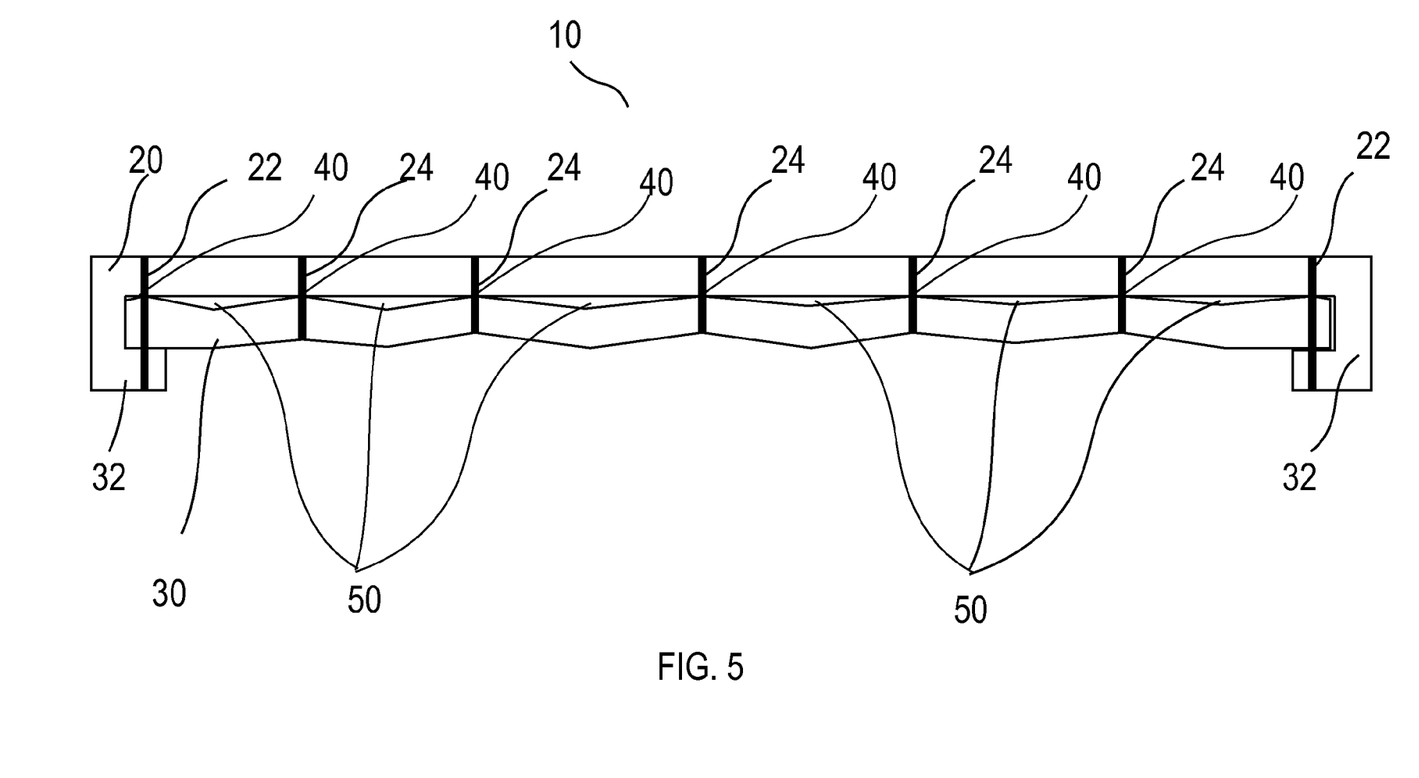
FIG. 5 is a cross section view taken along section line 5-5 shown in FIG. 4D.

As illustrated in FIG. 5, which is a schematic cross section of a protective cover such as that shown in FIG. 4D across cross section line 5-5, a protective cover 10 may include the plurality of attachment locations 41. These attachment locations may be mere contact points between the layers (e.g. such as when to materials are sewn together) or the attachment locations may be fixed attachments such as welding or adhesive. As shown in this example, a connective thread 24 may extend between the two layers 20, 30 to attach them. Unattached portions 50 may be located between the attachment points. The layers are shown with no contact along this unattached region 50 in FIG. 5, this is to illustrate their unattached nature allowing them to move freely from one another. However, the layers may maintain full contact along these regions as well. The periphery of the cover 5 may have a finished edge 32 having an attachment shown by the connecting thread 22.

In accordance with various embodiments, the stitched connection material may be sewn into the protective layer 20 and the anti-slip layer 30. Traditional furniture fabric stitching machines have been found by the inventor to be unable to handle the 200 cm width fabrics. Also, quilting the protective cover 10 increases the stress on sewing needles significantly. When using insufficiently capable needles, the needles would overheat and break going through both the anti-slip material and the protective layer. Traditional quilting machines proved insufficient at handling the stress on the needle. The use of traditional quilting machines, e.g. multi-needle sewing machines, caused excessive needle breakage in sewing through PVC-coated mesh fabric that is layered with a protective cover. As such, sewing through 2 layers of the anti-skid material and 2 layers of the protective material (see e.g. seams 34) proved too much for quilting-style sewing machines. To overcome the deficiencies of traditional quilting machines, a wide multi-needle quilting machine with larger needles may be used to attach the protective layer to the anti-slip layer (e.g. the protective fabric to the anti-slip backing). Also, a side hem or binding may be sewn around the periphery connection 22 on the protective cover without experiencing significant broken needles. Similarly, seam 34 may be sewn without experiencing a significant number of broken needles. A larger gauge needle in the single-needle sewing machine may be used to sew through four layers of fabric at, for example, the seams 34. For example, sewing machines for industrial carpet-manufacture may be used to stich the protective layer to the anti-slip layer, particularly at the seams 34. The carpet-style sewing machine is also sufficient to handle the 200 cm width fabrics used to form the protective cover 10.

In accordance with various other embodiments, the protective layer and the anti-slip layer may be laminated together, but his often causes a significant stiffening of the protective cover in its multi-layer regions. In such an embodiment extensive adhesives, temperatures, and/or pressures may be used to laminate the protective layer to the anti-slip layer. In various embodiments, the anti-slip material may be printed directly to the protective material in the form of discrete dots. In various embodiments, the anti-slip material may be attached by a hook and loop fastener system to the protective material. In various embodiments, the protective material may be impregnated or embossed with anti-slip materials.

Having described several embodiments herein, it will be recognized by those skilled in the art that various modifications, alternative constructions, and equivalents may be used. The various examples and embodiments may be employed separately or they may be mixed and matched in combination to form any iteration of the alternatives. Additionally, a number of well-known processes and elements have not been described in order to avoid unnecessarily obscuring the present invention. Accordingly, the above description should not be taken as not limiting the scope of the invention.

Those skilled in the art will appreciate that the presently disclosed embodiments teach by way of example and not by limitation. Therefore, the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall there between.

What is claimed is:

1. An anti-slip protective cover comprising:
a first layer formed of a protective material, with the protective material having a peripheral region surrounding an interior portion;
a second layer formed of another material that is an anti-slip material, with the anti-slip material having a peripheral region surrounding an interior portion; and
an attachment between the first layer and the second layer at at least a first location and a second location at the interior portion of the first layer and the second with a space between the first location and the second location in which the first layer and the second layer are unattached to each other.

2. The anti-slip protective cover of claim 1, wherein the first layer is larger than the second layer such that the first layer is folded back over the second layer prior to binding the two layers together proximal to the peripheral region.

3. The anti-slip protective cover of claim 1, wherein the connection is a connective material that is arranged in intervals extending across a portion of the interior portion of the anti-slip material and the protective material.

4. The anti-slip protective cover of claim 1, wherein the connection is a connective material that traverses the interior portion from a first portion of the peripheral region to a second portion of the peripheral region.

5. The anti-slip protective cover of claim 1, wherein the connection is a connective material that traverses the interior portion in two different directions.

6. The anti-slip protective cover of claim 1, wherein the connection quilts the first layer to the second layer.

7. The anti-slip protective cover of claim 1, wherein the connection is a connective material that is an adhesive intermittently positioned across a portion of the interior portion.

8. The anti-slip protective cover of claim 1, wherein the connection is a connective material that is a thread continuously extending across intervals across a portion of the interior portions.

9. The anti-slip protective cover of claim 1, wherein the protective material comprises a plurality of different panels extending from a central region operable to extend over a seat portion, a back portion, and arm portions of a chair or couch.

10. The anti-slip protective cover of claim 1, wherein anti-slip material extends substantially co-extensive with the protective material.

11. The anti-slip protective cover of claim 1, wherein the anti-slip material has surface properties with a higher resistance to slipping than the first layer protective material.

12. An anti-slip protective cover comprising:
a protective material forming a first layer of the protective cover, wherein the protective material comprises a plurality of different panels including a central region operable to extend over a seat portion, a back portion extending from the central region and operable to extend over a back portion of a chair or couch, and arm portions extending from the central region and operable to extend over arm portions of a chair or couch, with each of the plurality of different panels having a peripheral region surrounding an interior portion;
an anti-slip material forming a second layer of the protective cover, with the anti-slip material being substantially coextensive with each of the plurality of different panels and the anti-slip material and the protective material being connected to one another at intervals along the internal portions.

13. The anti-slip protective cover of claim 12, wherein two materials are connected at intervals extending across each of the panels.

14. The anti-slip protective cover of claim 13, wherein the connections extend from a first portion of the peripheral region to a second portion of the peripheral region.

15. The anti-slip protective cover of claim 12, wherein the connections traverse the interior portions in two different directions.

16. The anti-slip protective cover of claim 12, wherein the connections are made by connective material formed by thread and the connections quilt the protective material and the anti-slip material together.

17. The anti-slip protective cover of claim 12, wherein the back portion extending from the central region and the arm portions extending from the central region are attached to the central region by a seam.

* * * * *

(12) EX PARTE REEXAMINATION CERTIFICATE (11466th)
United States Patent
Markowitz (10) Number: US 9,603,462 C1
(45) Certificate Issued: Feb. 26, 2019

(54) ANTI-SLIP PROTECTIVE COVER

(71) Applicant: GREEN POINT DECOR, LLC, Brooklyn, NY (US)

(72) Inventor: Evan Markowitz, Brooklyn, NY (US)

(73) Assignee: GREEN POINT DECOR, LLC, Mount Kisco, NY (US)

Reexamination Request:
No. 90/014,013, Sep. 15, 2017

Reexamination Certificate for:
Patent No.: 9,603,462
Issued: Mar. 28, 2017
Appl. No.: 14/715,388
Filed: May 18, 2015

(51) Int. Cl.
*A47C 31/00* (2006.01)
*A47C 31/11* (2006.01)
*B60N 2/60* (2006.01)
*B60N 2/58* (2006.01)
*A47C 31/10* (2006.01)

(52) U.S. Cl.
CPC ............ *A47C 31/113* (2013.01); *A47C 31/11* (2013.01); *B60N 2/60* (2013.01); *A47C 31/10* (2013.01); *B60N 2/58* (2013.01); *B60N 2/609* (2013.01); *B60N 2/6018* (2013.01)

(58) Field of Classification Search
None
See application file for complete search history.

(56) References Cited

To view the complete listing of prior art documents cited during the proceeding for Reexamination Control Number 90/014,013, please refer to the USPTO's public Patent Application Information Retrieval (PAIR) system under the Display References tab.

*Primary Examiner* — Patricia L Engle (57) ABSTRACT

Disclosed herein is an anti-slip protective cover. The anti-slip protective cover includes a first layer formed of a protective material and a second layer formed of an anti-slip material, with the anti-slip material and the protective material having a peripheral region surrounding an interior portion. The anti-slip protective cover also includes a connective material binding the first layer to the second layer at at least one location on the interior portion and along at least a location proximal to the peripheral region. The connective material may be arranged in a plurality of strips extending across a portion of the interior portion of the anti-slip material and the protective material. The connective material may traverse the interior portion from a first portion of the peripheral region to a second portion of the peripheral region.

EX PARTE REEXAMINATION CERTIFICATE

THE PATENT IS HEREBY AMENDED AS INDICATED BELOW.

AS A RESULT OF REEXAMINATION, IT HAS BEEN DETERMINED THAT:

The patentability of claim 7 is confirmed.

Claims 1-6 and 8-17 are cancelled.

\* \* \* \* \*